United States Patent Office 3,180,844
Patented Apr. 27, 1965

3,180,844
SALTS OF MONOCARBOXYLIC ACID COPOLYMERS AS THICKENERS FOR NON-POLAR SOLVENTS
Richard T. Dickerson, Midland, Mich., assignor to The Dow Chemical Company, Midland, Mich., a corporation of Delaware
No Drawing. Filed Nov. 9, 1960, Ser. No. 68,158
15 Claims. (Cl. 260—30.6)

The present invention relates to thickened non-polar solvents and more particularly it concerns compositions comprising non-polar solvents and a minor proportion of a metal salt of certain polymeric polycarboxylic acids.

A principal object of the present invention is to provide homogeneous thickened compositions comprising non-polar solvents. It is a particular object of the invention to provide thickeners for non-polar solvents that can be formed in situ within the non-polar solvent to be thickened. Another object is to provide thickening agents which are highly effective at relatively low concentrations in achieving a given thickening effect. Further objects of the invention concern providing means for gelling or increasing the viscosity of non-polar solvents over wide temperature ranges. Other objects will become apparent hereinafter as the invention is more fully described.

It has been discovered that, in accordance with the invention, certain non-polar solvents as hereinafter defined are thickened by incorporating into them as a solute a minor proportion of a mono- or polyvalent metal salt of a lipophilic, linear polymeric polycarboxylic acid containing from about 0.05 to about 3 carboxyl groups per 100 combined monomer units.

The metal polymeric polycarboxylates of the invention can be incorporated into the non-polar solvent to be thickened in any convenient manner such as by directly dispersing them into the non-polar solvent. However, it is most advantageous to form the metal salts of the polymeric polycarboxylic acids in situ within the non-polar solvent to be thickened. In carrying out the invention in the latter manner, a suitable quantity of a lipophilic, linear polymeric polycarboxylic acid of the invention is dissolved in the non-polar solvent to be thickened and while therein, brought into and maintained in the presence of an effective quantity of a mono- or polyvalent metal cation or mixture of such cations. An "effective quantity" refers to a metal ion concentration at which significant thickening is obtained. Usually, a significant thickening effect is achieved by incorporating a sufficient amount of the metal ions employed to form at least about 0.05 metal carboxylate group per 100 combined monomer units in the polymeric polycarboxylic acid.

The quantities of the metal employed and its valence state are important variables having a pronounced influence upon the extent and character of the thickening that is achieved, e.g., increase in viscosity or gelation of the non-polar solvent. Another factor of considerable importance in controlling the thickening effect of the invention is the frequency of occurrence of the carboxyl group on the polymeric chain. By manipulation of these variables, it is possible to increase the viscosity of non-polar solvents or to form gels therefrom with small quantities of the metal polymeric polycarboxylates of the invention over wide temperature ranges.

Hereinafter, for the purposes of this specification and appended claims, the terminology "non-polar solvent" shall comprehend the group of non-polar organic solvents consisting of aromatic hydrocarbons, halogenated aromatic hydrocarbons and halogenated aliphatic hydrocarbons. Also to be included for the purposes of the present invention within the group of operable non-polar solvents are carbon disulfide, the mononitro-substituted aromatic hydrocarbons, trialkyl and triaryl phosphates and alkyl and aryl thioethers. Mixtures composed of a major proportion of one or more of the foregoing materials are also within the meaning of non-polar solvents.

The scope of operable non-polar, organic solvents is further delineated by means of the solubility parameter as defined by Hildebrand and Scott, The Solubility Of Non-electrolytes, 3rd Edition, American Chemical Society, Reinhold Publishing Corp., New York, New York (1950). On page 435 of their book, these authors refer to the portions of their book in which the term "solubility parameter" is defined and then proceed to list solubility parameters for selected materials. Pursuant to the solubility parameters reported therein, the class of non-polar solvents operable in the present invention has a solubility parameter range at 25° C. from about 8.2 to about 10.5. This solubility parameter generally correlates with other work reported in the field of solvent characterization which employs the terminology "cohesive energy density" as a parameter of solvent strength, according to the equation:

Solubility parameter (Hildebrand et al.) =
$\sqrt{\text{Cohesive energy density}}$ Specific examples of solvents that are operable are such aromatic hydrocarbons as benzene, toluene, ethylbenzene, xylene, propylbenzene, naphthalene, mesitylene, styrene, armethyl styrene, tetralin and the like. Other hydrocarbons that can be employed are the essentially aromatic hydrocarbons that can be obtained, for example, as distillation cuts from petroleum stocks and coal oils. Various halogenated aliphatic and aromatic hydrocarbons that can be effectively thickened in accordance with the present invention include methyl chloride, methylene chloride, carbon tetrachloride, methyl bromide, methyl iodide, ethyl chloride, ethyl bromide, ethyl iodide, 1,2-dichloroethane, 1,2-dibromoethane, 1,1,1-trichloroethane, 1,2-dichloroethylene, propylene chloride, amyl chloride, chlorobenzene, dichlorobenzene, trichlorobenzene, tetrachlorobenzene, hexachlorobenzene, chlorotoluene, bromotoluene, chloroethylbenzene and the like materials. Additional non-polar solvents that are operable are carbon disulfide, the mononitro aryls such as nitrobenzene and nitrotoluene; the alkyl and aryl thioethers such as diethylsulfide, dimethylsulfide, methyl ethyl sulfide, diphenyl sulfide, methyl phenyl sulfide and the like materials; and the triaryl and trialkyl esters of phosphoric acid such as triethylphosphate, tricresylphosphate and the like.

Most of the above-specified non-polar solvents are normally liquid at room temperatures. Liquidity at normal temperatures, however, is not a requirement for operability as good results can be obtained in accordance with the present invention in melts of solids that are obtained at temperatures below that temperature which is the upper limit of thermostability for the metal polymeric polycarboxylate that is employed. Good results are also obtained when the non-polar solvent is gaseous or readily vaporized at normal room temperatures and must either be pressurized or cooled, or both, to maintain it in a liquid state.

The polymeric polycarboxylic acids that are employed in the present invention to form metal polymeric polycarboxylates are non-crystalline, lipophilic, i.e., oil soluble, linear polymers. As employed herein, the term "linear" refers to the absence of substantial cross-linking between polymer chains but does not preclude the inclusion of graft copolymers or branched linear polymers.

Essential requisites for operability of the polymeric carboxylic acids are that they be miscible with the non-polar solvent to be thickened and contain from about 0.03 to about 3 pendant carboxyl groups per 100 combined monomer units. Such polymeric acids comprise relatively few polar or hydrophilic foci such as amine, amide, carbonyl or ether linkages, or such substituents as hydroxyl, halogen or oxy-acid groups, in addition to the required free carboxyl groups, that are not offset by large lipophilic hydrocarbon groups attached thereto which render the resulting combination oil soluble. Miscibility can be simply ascertained by stirring a small quantity of about 5 to 10 percent or so by weight of the polymeric acid into the non-polar solvent to be thickened and observing whether or not a visually continuous or homogeneous solution is obtained. The polymeric polycarboxylic acids must also be characterized by an average degree of polymerization of at least about 70 to about 4000 monomer units per polymer molecule depending upon the minimum degree in the range that is sufficient to provide an average of at least about 2 carboxyl groups per polymer molecule.

Polymeric polycarboxylic acid starting materials employed in the present invention can be prepared, for example, by polymerizing ethylenically unsaturated lipophilic monomers with a suitable quantity of a monomer polymerizable therewith containing a carboxyl group or a group that is convertible subsequent to polymerization to the desired carboxyl group such as acyl halide, ester, carboxylate, amide, nitrile and the like groups which can be hydrolyzed to provide carboxyl groups or formyl, methylol, aminomethyl, halomethyl and the like groups which can be oxidized to provide carboxyl groups.

Ethylenically unsaturated lipophilic monomers that can be employed with exceptional advantage are the oil-soluble, ethylenically unsaturated hydrocarbons and halo-substituted hydrocarbons which can be either aliphatic or aromatic. Exemplary lipophilic monomers are propylene, butylene, styrene, ar-ethyl styrenes, ar-propyl styrenes, ar-vinyl toluenes, ar-vinyl xylenes, ar-vinyl mesitylene ar-bromo styrenes, ar-chloro styrenes, ar-dichloro styrenes, ar-trichloro styrenes, $\alpha$-methyl styrene, $\alpha$,ar-dimethyl styrene and the like aliphatic and aromatic, substituted and unsubstituted olefins. Also operable are the conjugated diolefins such as, for example, butadiene, isoprene, 2,3-dimethylbutadiene, chloroprene and the like diolefins.

Other sources of lipophilic monomers are ethylenically unsaturated organic materials which, while containing hydrophilic foci such as, for example, ether, carbonyl, amide or amine linkages or such substituents as hydroxyl or oxy-acid groups, are sufficiently lipophilic, by virtue of large hydrocarbon portions thereof, to provide, when polymerized, lipophilic polymers. Examples of the latter materials are the vinyl esters of aliphatic and aromatic acids, alkyl esters of acrylic and substituted acrylic acids and the like materials such as vinyl butyrate, vinyl benzoate, ethyl acrylate, ethyl methacrylate and the like. It is readily apparent that such lipophilic monomers as the foregoing may not, in some instances as will be obvious to one skilled in the art, be employed in conjunction with carboxyl-providing monomers that either require hydrolysis or oxidation subsequent to polymerization in order to obtain the desired carboxyl group functionality.

Examples of polymerizable unsaturated monocarboxylic acids that can be incorporated into the polymeric polycarboxylic acids by direct or graft polymerization techniques include acrylic, methacrylic, $\alpha$-chloroacrylic, $\alpha$-bromoacrylic, $\alpha$-phenylacrylic, $\alpha$-propylacrylic, $\alpha$-butylacrylic, $\alpha$-cyclohexylacrylic, $\alpha$-octylacrylic, vinylbenzoic, crotonic and the like unsaturated monocarboxylic acids. It should also be understood that the esters and salts of the foregoing acids, which can be saponified and acidified, or simply acidified as the case need be, to provide the free acids are also operable. Similarly, acyl halides, nitriles and amides of the foregoing acids can also be hydrolyzed after polymerization to provide the necessary carboxylic acid functionality. Aldehydes, primary alcohols, primary alkyl halides, amines and the like that can be oxidized to provide carboxylic acid functionality include for example acrolein, vinylbenzyl alcohol, vinylbenzylchloride, vinylbenzylamine and the like.

The amount of the carboxyl group containing monomer or monomer that is hydrolyzable or oxidizable to provide carboxyl groups used in the preparation of the polymeric carboxylic acids must be sufficient to provide the desired frequency of pendant carboxylic acid groups. The polymeric carboxylic acids of the invention contain pendant carboxyl groups at a frequency from about 0.05 to about 3 carboxyl groups for each 100 combined monomer units.

The polymeric carboxylic acids of the invention are prepared by known means involving any convenient process technique such as batch or continuous polymerization procedures. For example, the ethylenically unsaturated lipophilic monomers and the carboxyl containing or providing monomers are brought together within a suitable reaction medium and in the presence of a suitable polymerization catalyst in proportions sufficient to provide the desired amount of carboxyl groups or groups which are convertible to carboxyl groups in the resulting polymerized product. Catalysts for the reaction may be any one or more of such reaction initiating means as heat, light, high energy radiation and free radical-providing chemical catalysts. Suitable catalysts of the latter category include such peroxidic materials as the alkali metal and ammonium persulfates and perborates, hydrogen peroxide, organic peroxides and hydroperoxides such as benzoyl peroxide, tertiary-butyl hydroperoxide, tertiary-butyl perbenzoate and the like. Other suitable catalysts of the latter category include the azo materials such as azobisisobutyronitrile.

The metals that are employed are the mono-, di- and trivalent metals that form salts with at least one of the strong mineral acids such as hydrochloric, sulfuric, nitric and chloric acids, with such salts being ionizable to provide metal cations that are not subject to spontaneous oxidation or reduction in aqueous media.

Whether mono- or polyvalent metal cations are employed in combination with the polymeric polycarboxylates varies according to the particular thickening effect desired. The monovalent metal salts provide an especially advantageous and sensitive means for increasing and controlling the viscosity of the above-described non-polar solvents. The polyvalent metal polymeric polycarboxylates have a more pronounced thickening effect and thereby provide means for gelling non-polar solvents.

Monovalent alkali metal-derived cations such as those obtained from lithium, sodium, potassium and the like are employed in the invention when controllable increases in viscosity of non-polar solvents are desired. The polyvalent metal cations of which representative examples are derived from the alkaline earth metals such as magnesium, calcium, barium and the like and such other polyvalent metals as zinc, iron, copper, lead and aluminum, are employed to form gels or, in a few instances, very viscous solutions that approximate gels. In all instances, i.e., with both the mono- and polyvalent cations, the thickening action of the metal carboxylates is reversible. This means that the solvent can be separated from the polymeric acid salt and that this same polymeric polycarboxylate can then be redissolved in the same or another appropriate non-polar solvent to achieve a thickening effect. However, while it is thus possible to first prepare the polymeric polycarboxylic acid salts and then dissolve them in the non-polar solvent to be thickened, to achieve a particular thickening effect, the in situ formation of the polymeric polycarboxylates permits better control of the resulting thickening effect. Also, thickening is obtained at an equilibrium state much more rapidly when the salts are formed in situ.

The alkali polymeric polycarboxylates of the invention can be prepared in situ by contacting the polymeric polycarboxylic acid in a non-polar solvent solution thereof with an alkali metal oxide or alkali metal hydroxide. For example, having first prepared a solution of a suitable quantity of the polymeric polycarboxylic acid in the non-polar solvent, an aqueous solution of an alkali metal hydroxide is thoroughly mixed into the non-polar solvent solution with sufficient agitation to form a water-in-oil emulsion. In this manner, sufficient contacting of the polymeric polycarboxylic acids with the alkali metal hydroxide is achieved to result in the in situ formation of the thickening salts. Since water is generally undesirable in the ultimately thickened composition, it is desirable to employ highly concentrated aqueous solutions of the metal hydroxide.

It has been discovered, however, that exceptional results can be obtained in accordance with the following procedure for forming any of the metal polymeric polycarboxylates in situ within the non-polar solvent to be thickened.

As in the above-described procedure, a solution of the polymeric polycarboxylic acid is prepared in the non-polar solvent. A metal salt which is soluble in and preferably dissolved in part of the solvent to be thickened and which comprises the metal cation in combination with the conjugate anion of an organic acid weaker than the polymeric polycarboxylic acid is then added to the non-polar solvent solution of the polymeric polycarboxylic acid in an amount sufficient to cause a desired increase in the solution's resistance to flow. The above term "weaker" means that the anion of the weak organic acid must have the ability to deprotonate the pendant carboxyl groups of the polymeric polycarboxylic acid. The term "acid" is employed in the foregoing in the broad sense as including those compounds capable of having a hydrogen atom replaced by a metal atom.

It should be noted that the order in which the polymeric polycarboxylic acid and the metal salt of the weak organic acid are added to the non-polar solvent to be thickened is not critical. Any convenient means of achieving such a solution may be employed which includes adding either or both of the reactants to the non-polar solvent to be thickened as dry powders or in a solution miscible with the non-polar solvent.

Weak organic acids that can be employed include the oil-soluble alkanols, alkylcarbonates, alkyl and aryl mercaptans, alkyl and aryl sulfites and the like weak organic acids that do not form a stable complex with the metal ion being employed as would, for example, a chelating agent, e.g., acetylacetone. Generally, alkyl chains of at least about 4 carbon atoms are needed to impart the necessary oil solubility to the foregoing weak organic acids such as the alkanols. However, it is preferred that such alkyl chains contain 8 or more carbon atoms. Specific examples of operable weak organic acids are octanol, 2-octylcarbonic acid, methylcarbonic acid, dodecylcarbonic acid, octyl mercaptan, 2-octylsulfurous acid and phenylsulfurous acid.

Weak organic acids that have been found to be highly effective in the invention are the alkyl-substituted phenols such as, for example, tertiary-butylphenol, octylphenol, dodecylphenol and the like. Alkali metal alkylphenolates can be prepared by mixing stoichiometric quantities of the metal, metal oxide, hydroxide or alcoholate with the alkylphenol in a solvent such as a lower alkanol. Certain other alkylphenolates such as those of magnesium can be prepared by reacting a metal alkoxide such as magnesium methoxide with the desired alkylphenol in the presence of an alkanol solvent. Alkylphenolates of most other metals such as those of copper, iron and lead can be prepared by a metathetical reaction in the presence of a solvent between a salt of the metal such as the chloride or bromine salts and an alkali metal alkoxide. The alkali metal salt by-product of this reaction, i.e., the corresponding chloride or bromide, being insoluble in the lower alkanol solvent, precipitates leaving the desired phenolate in solution.

The solvent is separated from the above-described reaction products by evaporation and the residue comprising the metal alkylphenolate is dissolved in a non-polar solvent, preferably the solvent that is to be thickened. This solution may then be filtered and made up to desired concentrations which can be determined, when precise control of this variable is desired, by simple volumetric titration with a standard acid.

The thickened non-polar solvent that is obtained in accordance with the foregoing procedure does not contain incorporated water or other impurities such as excess hydroxides or metal oxides which may result from entrainment in the previous method involving direct in situ treatment of the polymeric polycarboxylic acid with an aqueous hydroxide solution or a metal oxide. Other advantages of this method concern the precise control that can be obtained over the amount of metal cation that is in solution or, in effect, the extent of salt formation occurring in the dissolved polymeric polycarboxylic acid. The latter factor has a considerable bearing on the exact viscosity that is obtained and provides a convenient means for controlling the viscosity or gel formation.

The quantity of the metal cation incorporated into the non-polar solvent solution of the polymeric polycarboxylic acid solution is sufficient to achieve a chemical equivalence ratio, i.e., ratio of chemical equivalents of the metal cations for each chemical equivalent of carboxylic acid groups, that may range from about 0.1 to about 3. Above an equivalence ratio of about 3, the invention is still operative but the thickening effect is substantially less than the maximum effect obtainable at the specified lower equivalence ratios. Usually, a maximum thickening effect is accomplished within the range of equivalence ratios from about .9 to about 1.5.

In most applications, the desired thickening effect in the non-polar solvent can be achieved at a concentration of about 3 weight percent of the metal polymeric polycarboxylate, but as may be desired, thickening to a greater or lesser extent can be achieved with quantities of the polymeric acid salts from about 0.1 percent to as much as 10.0 percent or more based on the weight of the solvent.

The metal polymeric polycarboxylates of the invention are highly effective thickeners for the previously specified non-polar solvents. Such solvent and thickener compositions can be employed to great advantage in compositions where viscosity control or gelation of the non-polar solvent phase is desired. Examples of such applications are in certain explosive compositions, rocket fuels, pigment coatings and lacquer coatings wherein viscosity control of a non-polar solvent phase is important and in hand soaps, explosives and lubricants wherein gelation of the composition may be desired for effective operation. The thickeners are also highly useful for improving the persistence of pesticides and fungicides which may, themselves, be of the nature of non-polar solvents thickened by means of the invention or applied in non-polar solvents.

The following examples are given as further illustrations of the present invention.

EXAMPLE 1

A mixture of 0.5 weight percent acrylic acid and 99.5 weight percent styrene was polymerized in a recirculating coil reactor equipped with temperature controlling means and a presure control valve through which the polymeric product could be continuously removed from the reactor. At steady state reaction conditions, the pressure within the reactor was about 100 pounds per square inch and the temperature was about 130° C. Under these conditions, the reaction product consisted of about 40 to 50 percent of the desired copolymer and a remainder of unreacted monomers. Upon removal from the reactor, the reaction product was passed through a devolatilizer in which unreacted monomers were removed from the copolymer product to a level of less than 1 percent by weight of the remaining copolymer. The copolymer as obtained from the devolatilizer was a continuous strand which was cut or broken into pellets. It contained in chemically combined form approximately 0.9 percent acrylic acid, the remainder being styrene, and had a relatively uniform molecular weight and composition as compared to similar polymers that could have been made by means of a batch process.

A quantity of toluene, the non-polar solvent to be thickened in this instance, was dried over calcium chloride and distilled. Toluene solutions of the above-prepared styrene-acrylic acid copolymer were made up in concentrations as specified in Table 1 by mixing the polymer pellets with toluene and agitating the mixture for about 15 hours.

Next, alkali metal dodecyl phenolates were prepared by dissolving lithium metal and sodium and potassium hydroxides in ethanol and then adding a chemical equivalent (stoichiometric quantity) of dodecyl phenol to each of these solutions. The ethanol and water of reaction, when applicable, were removed from the reaction mixture by evaporation leaving a residue which, depending upon the reactants employed, was lithium, sodium or potassium dodecyl phenolate. Toluene solutions were prepared from these residues and the exact concentration of the alkali metal dodecyl phenolate was determined by means of a standard titration technique.

Sufficient quantities of the above-prepared alkali metal dodecyl phenolates were added to various toluene-polymer acid solutions to provide desired chemical equivalence ratios of alkali metal ions for each carboxyl group present in the solution. The resulting solution viscosities were measured on a Brookfield viscometer and are tabulated in centipoises in Table 1.

Note that variables affecting the rate of shear within the liquid being tested for its viscosity, such as the distance of the liquid surface from the spindle surface, spindle diameter and the speed thereof, influence the ratings that are obtained. The values reported in Table 1 are average results obtained by the use of different spindles except in those instances where constant results were obtained with all spindle sizes. It should also be further noted that since large changes in viscosity, as effected by the present invention, can be attributed to rather small variances in concentrations of the metal cations, carboxyl groups and amount of polymer acid present, small experimental errors can cause rather wide scattering in test data.

practice, however, more convenient methods, which involve lesser degrees of control of process variables, can be used to prepare the polymeric carboxylic acids, metal salts of lipophilic, weak organic acids and solutions thereof in the non-polar solvent that is to be thickened.

Generally, a single qualitative evaluation will be adequate. Thus, having as a desired objective a particular solution viscosity, it is usually desirable to achieve the specific result by adjusting the amounts of either or both of the polymeric polycarboxylic acid and the metal cation over wide ranges.

EXAMPLE 2

In this example, 1,2,3-trimethylbenzene (TMB) was thickened in accordance with a method similar to that of Example 1. The same polymeric polycarboxylic acid was employed in concentrations of 6.4 and 3.2 percent based on the weight of the solvent. Potassium dodecylphenolate was added to the solution of the polymeric polycarboxylic acid in amounts sufficient to provide 1.0 and 0.5 chemical equivalents of potassium for each carboxyl group present. The results are reported in Table 2 which also includes, for purposes of comparison, results that were obtained in toluene (Tol) solutions at comparable concentrations.

Table 2

| Solvent | Equivalent ratio K+ | Percent polymeric carboxylic acid | |
|---|---|---|---|
| | | 6.4 | 3.2 |
| TMB | 1.0 | 58,500 | 4,750 |
| Tol | 1.0 | 42,250 | 3,600 |
| TMB | 0.5 | 570 | 22.5 |
| Tol | 0.5 | 330 | 14 |

EXAMPLE 3

A copolymer of styrene and vinylbenzoic acid was prepared by charging 2 grams of vinylbenzoic acid and 98 grams of styrene to a sealed glass ampoule which was continuously maintained at 80° C. for 48 hours and subsequently at 100° C. for 24 hours. Nearly complete conversion of the monomers to the copolymer was achieved but to remove trace amounts of unreacted monomer and impurities, the polymer was dissolved in toluene, filtered and precipitated from the toluene by pouring the solution into methanol. The copolymer thus recovered was dried and a toluene solution thereof was prepared containing 5 percent by weight of the copolymer. This solution was treated with 2 molar equivalents of lithium dodecylphenolate. (The 2 molar equivalents were based on the assumption of 2 percent vinylbenzoic Table 1

| Metal ion employed | Equiv. ratio | Percent polymeric polycarboxylic acid in toluene | | | | | |
|---|---|---|---|---|---|---|---|
| | | 8.0 | 6.4 | 5.12 | 4.16 | 3.20 | 2.24 |
| Blank | 0 | 21.5 | 11.5 | 7.0 | 4.3 | 2.9 | |
| Lithium | 0.43 | >100,000 | 38,500 | 15,600 | 5,550 | 750 | |
| | 0.57 | >100,000 | >100,000 | >100,000 | 30,000 | 6,300 | |
| | 0.65 | >100,000 | >100,000 | 100,000 | 84,000 | 3,000 | |
| | 0.70 | >100,000 | >100,000 | >100,000 | 72,500 | 17,000 | |
| | 0.74 | >100,000 | >100,000 | >100,000 | 85,000 | 75,000 | 6,000 |
| | 0.87 | >100,000 | 41,000 | 23,250 | 6,000 | 1,575 | |
| Sodium | 0.55 | 1,240 | 405 | 125 | 45 | 17.5 | |
| | 0.71 | 8,400 | 1,375 | 520 | 175 | 35 | |
| | 0.88 | 24,250 | 4,600 | 1,890 | 720 | 130 | |
| | 1.1 | >100,000 | 68,000 | 32,600 | 25,000 | 5,000 | |
| | 2.2 | | | | | 30,000 | 2,000 |
| | 3.3 | | | | | 40,000 | 4,000 |
| Potassium | 0.50 | 870 | 330 | 140 | 49 | 14 | |
| | 0.70 | 4,800 | 2,100 | 960 | 262 | 74 | |
| | 1.00 | 79,500 | 42,250 | 23,000 | 11,600 | 3,600 | |
| | 1.40 | 43,000 | 25,000 | 10,000 | 4,900 | 1,350 | |

The above methods for carrying out the invention are designed to achieve as nearly as is practically possible, results that were susceptible of empirical correlation. In practice, acid combined in the polymer.) This resulted in the conversion of the initially thin, oily solution of the copolymer into a viscous syrup-like mass.

EXAMPLE 4

A polymeric polycarboxylic acid containing in chemically combined form 1.64 weight percent acrylic acid with the remainder styrene was prepared by a method similar to that of Example 1. Five grams of this polymer were dissolved in 100 milliliters of each of the solvents listed in the following table. Lithium dodecylphenolate, prepared in Example 1, was added to each solution in an amount sufficient to provide 2.0 metal cations for each carboxyl group present in the solution. The resulting Gardner viscosities, along with the estimated viscosity in poises are reported below in Table 3. The solutions of the polymeric polycarboxylic acid before the addition of the Li+ all had a Gardner viscosity of A4 or less.

*Table 3*

| Solvent thickened | Gardner viscosity after Li+ added | Estimated viscosity (poises) |
| --- | --- | --- |
| Xylene | Z9 | 300 |
| Benzene | Z7 | 200 |
| Chlorobenzene | Z7 | 200 |
| o-Dichlorobenzene | Z9+ | 300 |
| 1-methylnaphthalene | Z9+ | 300 |
| Methylene chloride | Z4 | 63 |
| Chloroform | G | 1.65 |
| Carbon tetrachloride | Z9+ | 300 |
| Tetrachloroethylene | Z9+ | 300 |
| Diethyl sulfide | Z3 | 98.5 |
| Carbon disulfide | Z3 | 46.3 |
| Nitrobenzene | Z | 22.7 |

EXAMPLE 5

The thickening effects achieved with various metal cations were studied in 5 percent solutions in toluene of a polymeric polycarboxylic acid consisting of 2 percent acrylic acid with the remainder styrene that had been prepared in accordance with the method of Example 1.

The metal dodecylphenolates employed except for magnesium which was employed in the form of magnesium 2-octylcarbonate, were prepared by means of a metathetical reaction between the chloride salt of the metal and an alkali metal phenolate in the presence of ethanol. The resulting alkali metal chloride was insoluble in the ethanol and precipitated leaving the desired metal dodecylphenolate in solution. The ethanol was evaporated leaving a residue of the desired metal dodecylphenolate which was then dissolved in toluene to give approximately ½ molar concentrations of the weak acid salt.

The magnesium 2-octylcarbonate was prepared in the following manner. To 200 milliliters of dry methanol was charged 12 grams of magnesium turnings with cooling of the reaction mixture as required. The reaction mixture thus obtained was mixed with 130 grams of 2-octanol and 200 milliliters of dry toluene. The resulting mixture was then treated with sufficient Dry Ice to thoroughly cool the solution and saturate it with $CO_2$. The methanol and toluene solvents were removed as an azeotrope by distillation through a 20 plate Oldershaw distillation column. After removal of the azeotrope, the bottoms were increased to a temperature of 90° C. and the pressure was gradually reduced to about 100 millimeters of mercury and the distillate was removed until the bottoms temperature reached 52° C. The clear, viscous solution thus obtained was diluted with toluene to a volume of 1000 milliliters to give a magnesium ion concentration of 0.5 M.

The metal salt solutions of the weak organic acids were then added dropwise to the toluene solution of the polymeric polycarboxylic acid until a substantial thickening effect was observed. It was found that the metal cations of $Ca^{++}$, $Zn^{++}$, $Pb^{++}$, $Ba^{++}$, $Mg^{++}$ and $Al^{+++}$ all caused the formation of a gel. $Fe^{+++}$ and $Cu^{++}$ each caused the formation of very viscous solutions that approximated gels.

EXAMPLE 6

A thickened paint remover formulation was prepared according to the following procedure. A copolymer containing in chemically combined form about 99.1 percent by weight of styrene and 0.9 percent by weight of acrylic acid was added to methylene chloride in an amount sufficient to provide a solution having 10 percent polymer solids. One volume of this methylene chloride-polymer solution was then diluted with 3 volumes of additional methylene chloride and 1 volume of a 50 percent aqueous sodium hydroxide solution. After stirring, the resulting mixture became very viscous, with the aqueous phase being suspended throughout the thickened methylene chloride phase in the form of small droplets.

The thickened composition was then applied to a fir-plywood surface painted with a white enamel. Another similarly painted plywood panel was also treated with methylene chloride alone. The paint treated with the thickened composition softened and was readily removable from the wood surface. However, the paint treated with the methylene chloride alone, while being somewhat softened, was not easily removed due to the fact that the methylene chloride evaporated before adequate penetration of the solvent into the paint film was achieved.

In a manner similar to that of the foregoing examples, other non-polar solvents that have a solubility parameter at 25° C. from about 8.2 to about 10.5 selected from a group consisting of aromatic hydrocarbons, halogenated aromatic hydrocarbons, halogenated aliphatic hydrocarbons, mononitro-substituted aromatic hydrocarbons, triaryl and trialkyl phosphates, aryl and alkyl thioethers and mixtures of solvents composed of a major proportion of one or more of the foregoing solvents are thickened by incorporating into them and compositions comprising such solvents, a thickening quantity of a lipophilic polymeric polycarboxylic acid containing from about 0.05 to about 3 carboxylic acid groups per 100 combined monomer units and from about 0.01 to about 5 chemical equivalents of a metal cation such as sodium, potassium, cesium, rubidium, calcium, magnesium, copper, lead, zinc, aluminum and iron derived mono-, di- and trivalent cations. Solvents employed for at least a portion of the solvents in the foregoing examples are benzene, toluene, ethylbenzene, xylene, propylbenzene, naphthalene, styrene, mesitylene, tetralin, methyl chloride, methylene chloride, carbon tetrachloride, methyl bromide, methyl iodide, ethyl bromide, ethyl chloride, ethyl iodide, 1,2-dichloroethane, 1,2-dibromoethane, 1,1,1-trichloroethane, 1,2-dichloroethylene, propylene chloride, amyl chloride, chlorobenzene, dichlorobenzene, trichlorobenzene, tetrachlorobenzene, hexachlorobenzene, chlorotoluene, bromotoluene, chloroethylbenzene, nitrobenzene, nitrotoluene, carbon disulfide, diethylsulfide, methyl ethyl sulfide, methyl sulfide, phenyl sulfide, methyl phenyl sulfide, triethylphosphate, tricresylphosphate and mixtures of one or more of the foregoing.

What is claimed is:

1. A composition of matter comprising a non-polar organic solvent having a solubility parameter from about 8.2 up to about 10.5 at 25° C. selected from the group consisting of aromatic hydrocarbons, halogenated aromatic hydrocarbons, halogenated aliphatic hydrocarbons, mononitro-substituted aromatic hydrocarbons, alkyl and aryl thioethers, carbon disulfide and trialkyl and triaryl esters of phosphoric acid and dissolved therein a thickening quantity of a metal salt of a lipophilic monocarboxylic acid copolymer characterized by having an average from about 0.05 to about 3 metal carboxylate groups per 100 combined monomer units and a degree of polymerization sufficient to provide an average of at least about 2 carboxylate groups per polymer molecule, wherein the metal cation is selected from the group consisting of mono-, di- and trivalent ions of metals that form salts with at least one of the mineral acids selected from the group consisting of hydrochloric, sulfuric, nitric and chloric acids, which salts ionize to provide metal ions that are not subject to spontaneous oxidation or reduction in aqueous media.

2. A composition of matter as in claim 1 wherein the metal salt of the lipophilic copolymer is an alkali metal salt.

3. A composition of matter as in claim 1 wherein the metal salt of the lipophilic copolymer is an alkaline earth metal salt.

4. A composition of matter as in claim 1 wherein the metal salt of the lipophilic copolymer is a zinc salt.

5. A composition of matter as in claim 1 wherein the metal salt of the lipophilic copolymer is a copper salt.

6. A composition of matter as in claim 1 wherein the metal salt of the liphophilic copolymer is a lead salt.

7. A composition of matter as in claim 1 wherein the metal salt of the lipophilic copolymer is an aluminum salt.

8. A composition of matter as in claim 1 wherein the metal salt of the lipophilic copolymer is an iron salt.

9. A composition of matter as in claim 1 wherein the amount of the copolymer employed is within the range from about 0.1 to 10 percent by weight of the non-polar solvent.

10. A method for thickening a non-polar organic solvent having a solubility parameter from about 8.2 to about 10.5 at 25° C. selected from the group of non-polar solvents consisting of aromatic hydrocarbons, halogenated aromatic hydrocarbons, halogenated aliphatic hydrocarbons, mononitro-substituted aromatic hydrocarbons, alkyl and aryl thioethers, carbon disulfide and trialkyl and triaryl esters of phosphoric acid, which method comprises admixing with said solvent in any order (A) at least 0.1 and up to 10 percent by weight of the non-polar organic solvent of a lipophilic, linear monocarboxylic acid copolymer characterized by having an average from about 0.05 to about 3 carboxyl groups per 100 combined monomer units and a degree of polymerization sufficient to provide an average of at least about 2 carboxyl groups per polymer molecule and (B) from about 0.1 to about 3 chemical equivalents of a metal cation selected from the group of mono-, di- and trivalent ions of metals that form salts with at least one of the mineral acids selected from the group consisting of hydrochloric, sulfuric, nitric and chloric acids, which salts are ionizable to provide metal ions that are not subject to spontaneous oxidation or reduction in aqueous media.

11. A method as in claim 10 wherein the quantity of the metal cation employed is sufficient to form at least about 0.05 metal carboxylate groups per 100 combined monomer units in the copolymer.

12. A method as in claim 10 wherein the metal cation is added to the non-polar solvent as a salt of a weak organic acid in which the anion has a greater affinity for a hydrogen ion than the conjugate carboxylate ion of the copolymer.

13. A method as in claim 10 wherein the metal cation is added to the non-polar solvent as a salt of an alkylphenol.

14. A method as in claim 10 wherein the metal cation is an alkali metal derived cation.

15. A method as in claim 10 wherein the metal cation is an alkaline earth metal derived cation.

References Cited by the Examiner
UNITED STATES PATENTS

| | | | |
|---|---|---|---|
| 2,657,189 | 10/53 | Pinkney | 260—30.6 |
| 2,702,796 | 2/55 | Fine | 260—30.8 |
| 2,923,692 | 2/60 | Ackerman et al. | 260—33.6 |
| 2,937,993 | 5/60 | Pattenden et al. | 252—41 |
| 2,966,401 | 12/60 | Myerholtz | 44—7 |
| 2,978,372 | 4/61 | Bergstedt et al. | 260—30.6 |
| 3,030,342 | 4/62 | Tiefenthal et al. | 260—78.5 |

MORRIS LIEBMAN, *Primary Examiner.*

DANIEL ARNOLD, *Examiner.*